Jan. 9, 1951  
D. G. REMPEL  
APPARATUS FOR PRODUCING HOLLOW  
RUBBER OR LIKE ARTICLES  
2,537,089
Filed Nov. 2, 1946
3 Sheets-Sheet 2
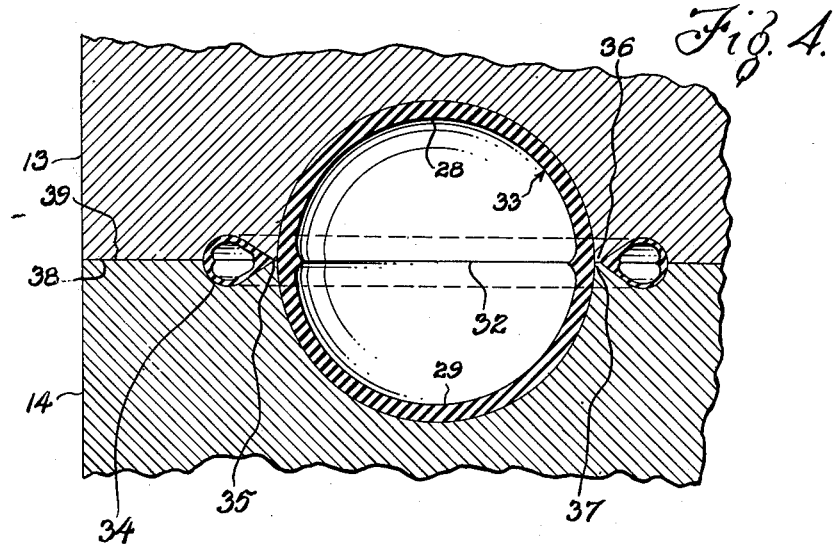
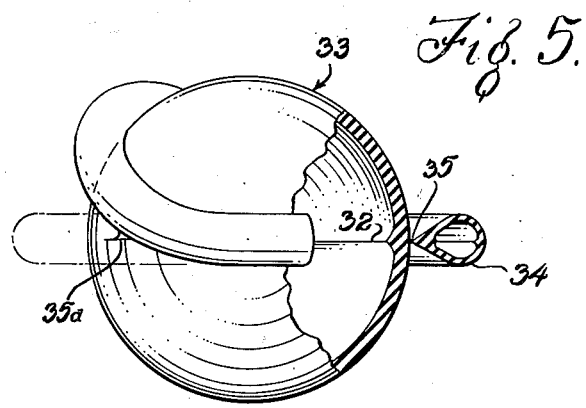
INVENTOR.  
Dietrich G. Rempel  
BY  
William Cleland  
Attorney Jan. 9, 1951   D. G. REMPEL   2,537,089
APPARATUS FOR PRODUCING HOLLOW
RUBBER OR LIKE ARTICLES
Filed Nov. 2, 1946   3 Sheets-Sheet 3
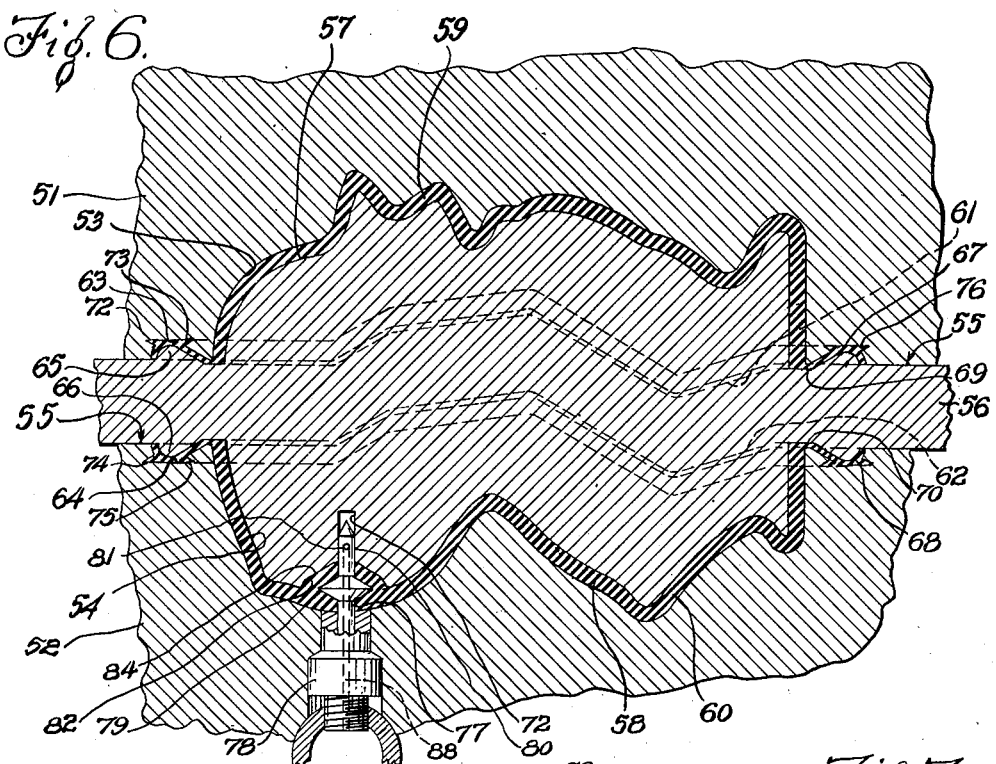
Fig. 6.
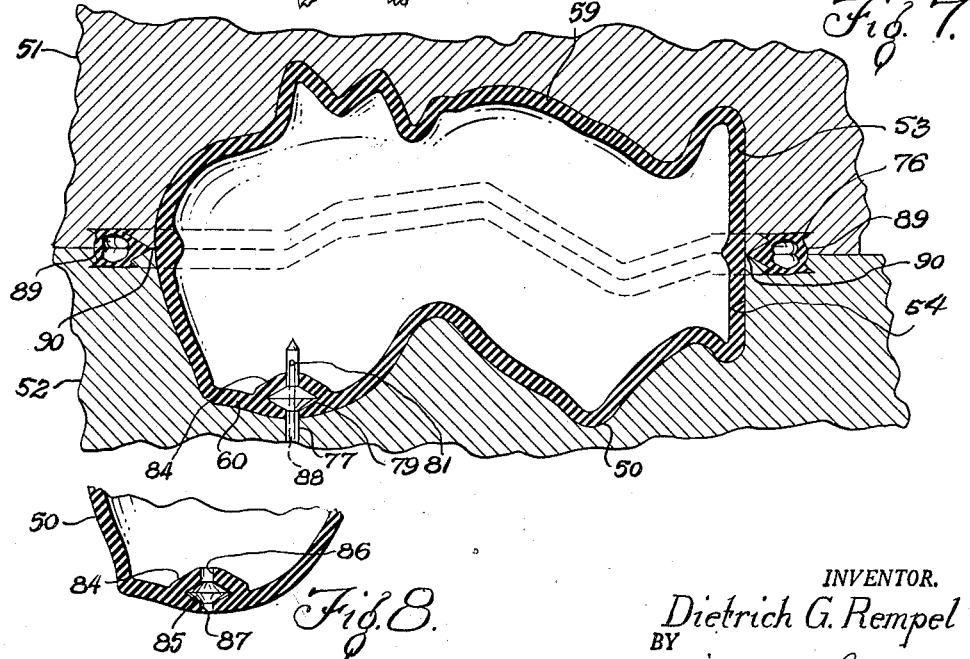
Fig. 7.
Fig. 8.
INVENTOR.
Dietrich G. Rempel
BY
William Cleland
Attorney Patented Jan. 9, 1951

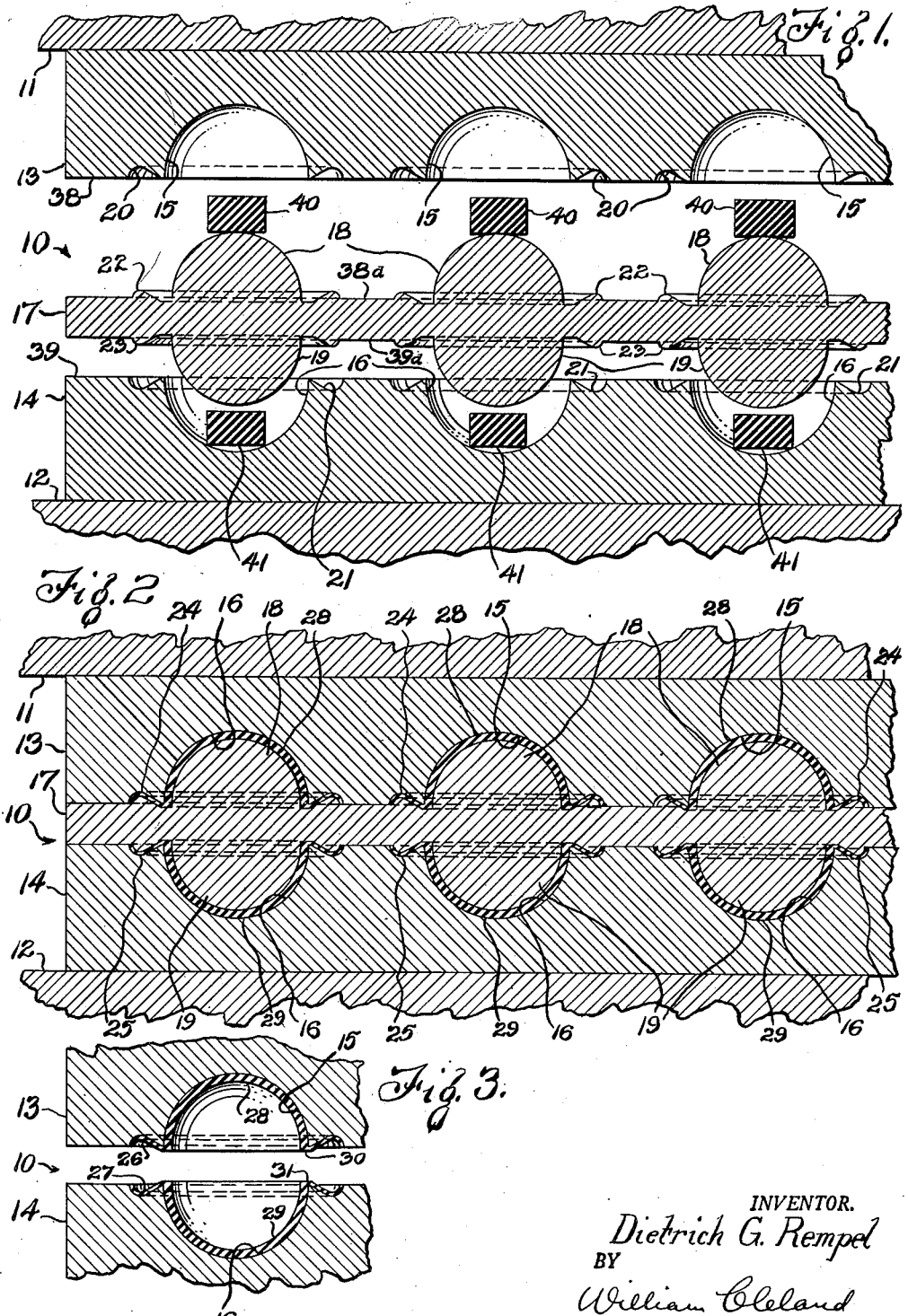

2,537,089

UNITED STATES PATENT OFFICE 2,537,089

APPARATUS FOR PRODUCING HOLLOW RUBBER OR LIKE ARTICLES

Dietrich G. Rempel, Akron, Ohio, assignor to Rempel Enterprises, Akron, Ohio, an Ohio partnership Application November 2, 1946, Serial No. 707,373

7 Claims. (Cl. 18—42)

1

This invention relates to apparatus for producing hollow rubber or like articles.

In the past hollow rubber articles have been produced, for example, by preforming separate halves thereof in a mold including relatively movable cavity mold sections and an intermediate core member, the core member being removable to permit moving mold sections together to butt-splice the two halves into a complete preformed article which is then placed in a separate mold and vulcanized under requisite heat and internal pressure. Two sets of molds were usually required for this purpose, a preforming mold and a vulcanizing mold, and vacuum means was required to hold the halves in the cavities of the preforming mold for the butt-splicing operation, which was the primary reason for requirement of the second or vulcanizing mold. This butt-splicing method was generally confined to spherical articles or hollow articles which could be spliced about a parting line substantially in a plane. Moreover, in the butt-splicing operation, there was a tendency for the abutting edge portions of the preformed halves to buckle inwardly, resulting in the frequent production of defective articles.

An object of the present invention is to provide improved apparatus by which rubber or like hollow articles may be preformed in halves and butt-spliced and vulcanized in the same mold, and in which is provided highly effective means for retaining the true shapes of the halves without buckling in the mold cavity during the butt-splicing and vulcanizing operations.

Another object of the invention is to provide molding apparatus of the character described, including improved means by which the excess article-forming material, which ordinarily forms an undesirable rind or flash on the article corresponding to the parting line of the article-forming mold, is not only utilized to advantage for holding the article halves in their respective mold cavities for the butt-splicing operation, but is predeterminately formed in a manner by which the excess material is very easily removed without substantial trace of such excess on the outer surface of the finished article, and whereby there is eliminated the usual necessity for removing the rind or flash from the article as by buffing or other operations.

Another object of the invention is to provide apparatus of the character described for forming hollow rubber or like articles in which excess article-forming material will not be formed into a sticky mass outwardly of the forming mold cavities.

Another object of the invention is to provide article-forming apparatus of the character described, including improved means for forming in the wall of the article an integral device of the same material and having therein a hollow cavity, such as for a noise-maker or whistle, the device being formed to accurately predeterminate size and shape.

These and other objects of the invention will be manifest from the following brief description and the accompanying drawings.

Of the accompanying drawings:

Figure 1 is a fragmentary vertical cross-section through an article preforming and vulcanizing mold embodying the features of the invention, the same being shown in a partially open position prior to the mold closing operation to preform article halves.

Figure 2 is a view similar to Figure 1, but with the mold parts in fully closed position to preform the article halves.

Figure 3 is a similar cross-section of a portion of the mold shown in Figures 1 and 2, but with the intermediate core member removed prior to closing the cavity mold sections.

Figure 4 is a view similar to Figure 3, on an enlarged scale, illustrating the cavity mold sections in fully closed position for preforming a spherical article or ball therein.

Figure 5 is an elevational view, partly broken away and in section, of an article as preformed in the mold, and illustrating a manner of removing the preformed excess material from the finished article.

Figure 6 is a fragmentary cross-sectional view, corresponding to Figure 2, through a modified form of preforming and vulcanizing mold.

Figure 7 is a view similar to Figure 6, but with the intermediate core member removed, and with the article butt-spliced for the vulcanizing operation.

Figure 8 is a fragmentary detailed view of a portion of a completed article, formed in the mold of Figure 7, and illustrating a noise-making device or whistle integrally formed within the wall of the article.

Referring particularly to Figures 1 and 2, there is illustrated the sectional cavity mold 10, mounted between upper and lower platens 11 and 12 of a vulcanizing press of known type, the mold being designed for carrying out the multiple functions of preforming and butt-splicing halves of hollow articles of rubber or like plastic material and vulcanizing the completed articles.

Mold 10 comprises upper and lower mold sections 13 and 14, suitably secured to the upper and lower press platens 11 and 12, respectively, the mold sections having therein plurality of spaced hemispherical ball-forming cavities 15 and 16, adapted to cooperate to form a completed ball in a manner to be described later. For preforming and butt-splicing article halves in the mold, an intermediate core member 17 is removably supported by suitable lost motion means (not shown) to be movable with opening and closing of the press, whereby when the press is fully open there is sufficient clearance between the core member and upper and lower mold sections to permit loading the mold with article-preforming material, and when the press is closed, as shown in Figure 2, the mold sections will be in positive registry with opposite sides of the core member. In this closed position, hemispherical cores 18 and 19 on the core member will be in complemental registry with the mold cavities 15 and 16, respectively, but with a space between the surfaces of the cores in the cavities corresponding to the desired thickness of the balls to be produced. Figure 1 shows the apparatus in an intermediate closing position after the loading step.

In the present construction, improved means is provided for preforming excess stock which is normally squeezed outwardly from the article-forming cavities, around the parting surfaces of the mold sections, and which excess is usually required to be removed by subsequent cutting, buffing and other operations. In the present instance, the forementioned article-forming spaces are extended, by provision of annular cavities 20 and 21 in the upper and lower mold sections 13 and 14, respectively, and reciprocal, annular ribs 22 and 23 on the core member, adapted in said mold closed position of Figure 2 to provide cavities 24 and 25 for forming said excess article-forming material into complemental, annular, channel-shaped portions 26 and 27, connected to the abutment edges of the ball halves 28 and 29 by thin walls of rubber 30 and 31, best shown in Figure 3 in which is shown a partially open position of the mold with the core member removed.

As best shown in Figures 3 and 4, the construction of the mold is such that when the press is closed, with the core member 17 removed, to positive registering position of the mold sections 13 and 14 (see Figure 4), the preformed halves 28 and 29 will be butt-spliced together at the complementally formed abutment edges thereof, as indicated at 32, 32 to form completed balls 33. Simultaneously with butt-splicing of the ball halves, the channel halves 24 and 25 will be similarly butt-spliced into annular, tubular members 34 connected to the balls only by very thin, frangible webs 35, around the joining planes thereof. The thin web 35 may be formed by complemental rib-like portions 36 and 37 on the mold sections 13 and 14, providing predeterminately spaced surface portions. Complemental surface portions 38 and 39 around the marginal edges of the upper and lower mold sections provide for positive registry of the same in the closed position of Figure 4, while in the closed position of Figure 2 said surface portions 38 and 39 are adapted to be in positive registry with corresponding surface portions 38a and 39a on the intermediate core member 17.

In the operation of the apparatus described above, while the press is in the fully open position, with the intermediate core member 17 in spaced relation between the upper and lower mold sections, unvulcanized rubber slugs 40 and 41, of predeterminate volume in excess of what is required to form complete article halves 28 and 29, are placed in the lower mold cavities 16 and on top of the cores 18. Figure 1 illustrates the press approaching closed position with the slugs in position. When the mold sections have thus been moved into positive registry with the core member 17, as shown in Figure 2, the slugs 40 and 41 will be formed into article halves 28 and 29, with channel-shaped portions 24 and 25 formed from excess material squeezed from the article-forming cavities and connected thereto by webs of rubber 30 and 31 (see Figures 2 and 3). During the preforming operations, the mold sections will be heated at least from previous vulcanizing operations, while the intermediate core member may be in relatively colder condition, whereby the preformed rubber halves will have partial cure. Because of the relatively colder condition of the core member, when the press is again opened to separate the mold parts, the article halves and connected formed-excess members thereof will be adhered to the mold sections so that the core member may be readily removed for the next operation. In this connection, adhesion of the article halves and formed-excess members of the core parts 18, 19 and 22, 23, respectively, thereof, may be materially minimized by providing a highly polished chromium or equivalent surfacing on said core parts.

After the core member 17 has been removed (see Figure 3), the press is operated to move the mold sections 13 and 14 toward positive registry, as shown in Figure 4, thereby to butt-splice the article halves 28 and 29 along the parting or abutment edges thereof, and at the same time similarly to butt-splice the halves of the formed excess channel-portions 26 and 27 into tubular members 34. During this butt-splicing operation, there is a natural tendency for abutment edge portions of the article halves 28 and 29 to buckle inwardly, because the halves are necessarily preformed slightly larger than an exact half sphere to assure proper adhesive contact. The formed excess portions 26 and 27 retained in the respective mold cavities 20 and 21 thereof, however, will through the connecting webs 30 and 31 (see Figure 3) prevent such inward buckling. It will be seen from the foregoing that excess rubber squeezed from the article-forming cavities and from the merged webs 30 and 31 will be squeezed into the registering excess-forming cavities unrestrictedly, and although the formed excess need not be perfect the completed articles themselves will be perfectly formed and without blemishes around the parting lines thereof normally caused by said buckling tendency.

After butt-splicing the article halves, as shown and described in connection with Figure 4, the mold sections 13 and 14 are maintained in closed position while the finished balls 33 are subjected to heat of vulcanization for a limited period of time, in known manner. This vulcanization step may be carried out with or without inflation pressure within the article. If such pressure is desirable or necessary, a suitable volatile medium may be provided, as in the form of ammonia or other pills inserted in the lower article halves prior to the butt-splicing operation (see Figure 3).

When vulcanization is complete, the press is again opened to separate the mold sections for removal of the articles together with the annular members 34, which are readily removed from the balls by breaking the thin frangible webs 35, in the manner indicated at 35a in Figure 5. Removal of the members 34 in this manner will provide balls on which there is no substantial trace of flash formed by the corresponding mold parting surfaces, thereby eliminating the usual necessity for cutting, buffing, or tumbling operations to remove such flash.

The foregoing description has been made in connection with apparatus for making spherical objects, wherein the parting or abutment edges of the article halves are conveniently in a plane. The principle of the invention herein, however, is also fully capable of use for the production of irregular shaped articles, such as hollow rubber character dolls, wherein splice lines of the article halves necessarily follow irregular contours.

In Figures 6 and 7, for example, there is illustrated apparatus for preforming and vulcanizing a hollow rubber character duck. This preforming and vulcanizing apparatus, with certain modifications to be described, is substantially the same as described in connection with the Figures 1 to 5. Accordingly, referring particularly to Figure 6, the numerals 51 and 52 designate upper and lower mold sections having article-forming cavities 53 and 54 therein adapted to be in positive registry, as indicated at 55, with a removable intermediate core member 56 provided with core portions 57 and 58 on opposite sides thereof for complemental reception in the mold cavities 53 and 54, respectively, for forming opposite hollow halves 59 and 60 of the character animal. The abutment edges of the article halves follow irregular contour lines as indicated generally at 61 and 62.

As before, the upper and lower mold sections are provided with opposed excess-forming cavities 63 and 64 and complemental forming ribs 65 and 66 for forming therewith continuous, complemental, channel-shaped halves 67 and 68, connected to the irregular-shaped abutment edges of the halves 59 and 60 by thin web portions indicated at 69 and 70, the thickness of said portions being determined exactly by said positive registry of the mold sections with intermediate core member 55.

To facilitate retention of the formed excess halves 67 and 68 in the respective upper and lower mold sections, continuous or discontinuous undercut recesses 72, 73 and 74, 75 may be provided around cavities 63 and 64 of the upper and lower mold sections, respectively. In the article half preforming operation, to be described, these undercut portions have excess rubber forced into the same to form integral correspondingly continuous or discontinuous undercut ribs 76, which may be yieldingly flexed for permitting release of the formed excess halves 67 and 68.

During the article half preforming operation, illustrated in Figure 6, a rubber whistle device may be integrally formed in the wall of the article. To this end, a pin 77 is suitably mounted in the lower mold member 52, as by means of an adaptor 78 fixed in the mold member, the pin being located in a relatively flattened area of the article-forming cavity 54 to extend inwardly of the mold cavity at an angle in the direction of opening and closing movements of the mold sections and intermediate core member. The pin 77 is provided with a suitably shaped enlargement at 79, in slightly spaced relation to the mold cavity surface, and also with a reduced extension 80 inwardly of the enlargement adapted to be received in a guide recess 72 in the core member 55 in the closed position of the respective mold parts. A recess at 82 in core portion 58, in cooperation with the adjacent surface portion of the cavity 54, the enlargement 79 of the pin, and reduced portions of the pin at opposite sides of the enlargement, provide forming spaces for producing an enlarged body 84 to be integral with the rubber walls of the article and having a noise-making chamber 85 and inner and outer aligned apertures 86 and 87 for communicating the interior of the article with the exterior through the chamber 85 (see Figure 8). A passage 88 may be provided through pin 77 for communicating, through an aperture or apertures 81 in the end thereof, the interior of the article during a subsequent vulcanizing step, either for inflating the article for the vulcanizing step or for subsequently deflating the article.

In the operation of the modified form of apparatus described, the preforming steps are carried out substantially in the manner described in connection with Figures 1 and 2, slugs of unvulcanized rubber being placed in position in the mold while the mold sections and core member are in open, spaced apart relation. Upon the registry of the upper and lower mold sections with the intermediate section, the rubber of the slugs is squeezed to form the article halves 59 and 60, as well as the formed excess members 67 and 68 connected thereto by the web portions 69 and 70. At the same time, the rubber is formed around the enlargement of pin 77 to produce an integral whistle body 84.

The upper and lower mold sections 51 and 52 are then separated and the intermediate core member 56 is removed from between the same, the article halves being retained in the respective mold cavities with the abutment edges firmly held in position against buckling by the formed excess members 67 and 68, which in turn are yieldingly locked in their cavities by the flexible ribs 76 formed in the undercut recesses 72 to 75. Next, the upper and lower mold sections are moved into positive registry with each other to butt-splice the complemental abutment edges of the article halves 59 and 60 and the completmental formed-excess halves 57 and 58. This operation results in a completed hollow article having the tubular member connected thereto around the parting line by a thin web 90.

The vulcanizing step may next be carried out in the mold, in the manner previously described, and if desirable or necessary, pressure fluid may be applied to the interior of the article during the vulcanizing cycle, through the passage 88 and aperture 89 in the freely extending pin 77. When the vulcanizing cycle has been completed, the internal pressure of the article may be relieved through said pin aperture and passage, thereby eliminating the necessity for allowing the mold sections to cool before opening the mold for the removal of the article.

Upon so opening the mold, the vulcanized article will tend to stick to one section or the other thereof. Adhesion may be controlled as by use of soapstone lubricant or other means, so that the articles will adhere to the same mold section on successive operations. Upon removal of an article from the mold half to which it adheres, the formed-excess member 89 will be at least partially severed therefrom by disrupting of the frangible web 90, because said member 89 will also adhere to one or other of the mold sections. If there is no such partial severance, as in the event that both the article and member 89 should adhere to the same mold section, the complete removal of the article from that section will no doubt sever the connection with member 89, because of the locking connection of ribs 76 in the undercut recesses 72, 73 or 74, 75, as the case may be, and member 89 is then easily separately removable. Should the part 89 be still fully or partly connected to the article through the web 90, it is readily separated as previously described in connection with Figure 5. In separation of the article from the lower mold section, the pin 77 with its enlargement 79 is readily removable through the outer whistle aperture 87, by virtue of the yielding elasticity of the vulcanized rubber.

It will be seen from the foregoing that the excess-forming improvement not only facilitates the butt-splicing operation by preventing inward buckling of the abutment edges of the article halves, but also eliminates the necessity for buffing or other operations for removing the flash or rind. The improvement makes possible the use of the butt-splicing method for production of many types of hollow rubber or like articles in a manner which formerly was not practicable. It should be understood that annular, continuous tubular articles may be produced with similar apparatus, by providing for two formed-excess members, around the inner and outer peripheries, which are removable by disruption of thin frangible connecting webs, as above.

Other modifications of the invention may be resorted to without departing from the spirit thereof or the scope of the appended claims.

What is claimed is:

1. Apparatus for producing hollow articles of rubber or like plastic material, comprising relatively movable mold sections having article-forming cavities and a removable intermediate core member adapted to cooperate with said mold sections to preform plastic material into separate parts of a hollow article with the parts having complemental abutment edges, interengageable portions on said mold sections and on said core member providing for selective positive registry of said mold sections with the core member received therebetween and positive registry of the mold sections with each other when the core member is removed from between the same, said core member and mold sections having complemental male and female excess forming portions respectively coextensive with the mold parting line around said article-forming cavities and adapted to preform excess plastic material exuded from the mold article-forming cavities into complemental hollow excess-forming portions each of which has an abutment edge connected to one of said article parts by a web of the excess plastic material, said female excess forming portions of said mold sections having undercut portions in the forming surfaces thereof for reception of plastic material to retain the preformed excess hollow portions in the female excess forming portions thereof, the complemental article and excess forming portions of said mold sections being such that upon registry of the mold sections with said core member removed, said preformed article parts and preformed excess portions retained in the cavities thereof are butt-spliced to form a complete hollow article and a hollow member of formed excess connected to same by a thin frangible web of the plastic material.

2. Apparatus for producing hollow articles of rubber or like plastic material, comprising relatively movable mold sections having article-forming cavities and a removable intermediate core member adapted to cooperate with said mold sections to preform plastic material into separate parts of a hollow article with the parts having complemental abutment edges, interengageable portions on said mold sections and on said core member providing for selective positive registry of said mold sections with the core member received therebetween and positive registry of the mold sections with each other when the core member is removed from between the same, said core member and mold sections having complemental male and female excess forming portions respectively coextensive with the mold parting line or lines around said article-forming cavities and adapted to preform excess plastic material exuded from the mold article-forming cavities into complemental hollow portions each of which has an abutment edge connected to one of said article parts by a web of the excess plastic material, said female excess forming portions of said mold sections each having substantially continuous undercut portions coextensive with said mold parting line or lines for reception of plastic material to retain the preformed excess hollow portions in the female excess forming portions thereof, the complemental article and excess forming portions of said mold sections being such that upon registry of the mold sections with said core member removed said preformed article parts and preformed excess portions retained in the cavities thereof are butt-spliced to form a complete hollow article and a hollow member of formed excess connected to same by a thin frangible web of the plastic material.

3. Apparatus for producing hollow rubber or like articles, comprising relatively movable mold sections having article-forming cavities and a removable intermediate core member adapted to cooperate with the mold sections to preform plastic material into separate parts of a hollow article with the parts having complemental abutment edges, interengageable portions on said mold sections and on said core member providing for selective positive registry of said mold sections with the core member received therebetween and positive registry of the mold sections with each other when the core member is removed from between the same, a stem projecting inwardly of the cavity surface of one of said mold sections, said stem having thereon an enlargement disposed to be in spaced relation to correspondingly shaped portions of said cavity surface of said one mold section and said core member to form the wall of the corresponding article part with an integral device of predetermined accurate shape and size and having a chamber and an aperture communicating the interior of the chamber with the exterior of the article, the complemental forming portions of said mold sections being such that upon registry of said mold sections with said core member removed said preformed article parts are butt-spliced to form a complete hollow article.

4. Apparatus for producing hollow rubber or like articles, comprising relatively movable mold sections having article-forming cavities and a removable intermediate core member adapted to cooperate with the mold sections to preform plastic material into separate parts of a hollow article with the parts having complemental abutment edges, interengageable portions on said mold sections and on said core member providing for selective positive registry of said mold sections with the core member received therebetween and positive registry of the mold sections with each other when the core member is removed from between the same, a stem projecting inwardly of the cavity surface of one of said mold sections, said stem having thereon an enlargement disposed to be in spaced relation to correspondingly shaped portions of said cavity surface of said one mold section and said core member to form the wall of the corresponding article part with an integral device of predetermined accurate shape and size and having a chamber therein, the complemental forming portions of said mold sections being such that upon registry of said mold sections with said core member removed said preformed article parts are butt-spliced to form a complete hollow article.

5. Apparatus for producing hollow rubber or like articles, comprising relatively movable mold sections having article-forming cavities and a removable intermediate core member adapted to cooperate with the mold sections to preform plastic material into separate parts of a hollow article with the parts having complemental abutment edges, interengageable portions on said mold sections and on said core member providing for selective positive registry of said mold sections with the core member received therebetween and positive registry of the mold sections with each other when the core member is removed from between the same, a stem projecting inwardly of the cavity surface of one of said mold sections, said stem having thereon an enlargement disposed to be in spaced relation to correspondingly shaped portions of said cavity surface of said one mold section and said core member to form the wall of the corresponding article part with an integral device of predetermined accurate shape and size and having a chamber and substantially aligned apertures for communicating the interior of the article with the exterior through the chamber, said core member having a recess therein and said stem having an extension on the inner end thereof for reception in said recess in the mold closed position and the extension being of sufficient length to prevent entry of plastic material into the recess as the mold is being closed, the complemental forming portions of said mo'd sections being such that upon registry of said mold sections with said core member removed said preformed article parts are butt-spliced to form a complete hollow article.

6. Apparatus for producing hollow rubber or like articles, comprising relatively movable mold sections having article-forming cavities and a removable intermediate core member adapted to cooperate with the mold sections to preform plastic material into separate parts of a hollow article with the parts having complemental abutment edges, interengageable portions on said mold sections and on said core member providing for selective positive registry of said mold sections with the core member received therebetween and positive registry of the mold sections with each other when the core member is removed from between the same, a stem projecting inwardly of the cavity surface of one of said mold sections, said stem having thereon an enlargement disposed to be in spaced relation to correspondingly shaped portions of said cavity surface of said one mold section and said core member to form the wall of the corresponding article part with an integral device having a chamber and substantially aligned apertures for communicating the interior of the article with the exterior through said chamber, the complemental forming portions of said mold sections being such that upon registry of said mold sections with said core member removed said preformed article parts are butt-spliced to form a complete hollow article, said stem having a passage therethrough for vulcanizing pressure fluid and an opening from the passage adjacent the end of the stem for admission of the pressure to the interior of the completely formed hollow article in the mold.

7. Apparatus for producing articles of rubber or like plastic material comprising relatively movable mold sections having article-forming cavities and a removable intermediate core member adapted to cooperate with said mold sections to preform plastic material into separate parts of an article with the parts having complemental abutment edges, interengageable portions on said mold sections and on said core member providing for selective positive registry of said mold sections with the core member received therebetween and positive registry of the mold sections with each other when the core member is removed from between the same, said core member and mold sections having complemental male and female excess-forming portions respectively coextensive with the mold parting line around said article-forming cavities and adapted to preform excess plastic material exuded from the mold article-forming cavities into complemental hollow excess-forming portions each of which has an abutment edge connected to one of said article parts by a web of the excess plastic material, the complemental article and excess-forming portions of said mold sections being such that upon registry of the mold sections with said core member removed said preformed article parts and preformed-excess portions retained in the cavities thereof are butt-spliced to form a complete article and a hollow member of formed excess connected to same by a thin frangible web of the plastic material.

DIETRICH G. REMPEL.

REFERENCES CITED

The following references are of record in the file of this patent:

UNITED STATES PATENTS

| Number | Name | Date |
|---|---|---|
| 1,310,441 | Roberts | July 22, 1919 |
| 1,400,146 | Eggers et al. | Dec. 13, 1921 |
| 2,148,079 | Martin, Jr. | Feb. 21, 1939 |
| 2,223,019 | Gammeter | Nov. 26, 1940 |
| 2,304,190 | Milner | Dec. 8, 1942 |
| 2,331,630 | Rempel | Oct. 12, 1943 |
| 2,354,241 | Anderson | July 25, 1944 |